United States Patent
Hendey, Sr. et al.

(10) Patent No.: US 8,051,723 B2
(45) Date of Patent: Nov. 8, 2011

(54) ENCODER-TYPE REGISTER FOR AN AUTOMATIC WATER METER READER

(75) Inventors: Arthur Hendey, Sr., Beaumont, CA (US); Ronnel Gallon, Orange, CA (US); Ian Harvey, Bristol (GB)

(73) Assignee: Performance Meter, Inc., Beaumont, CA (US)

( * ) Notice: Subject to any disclaimer, the term of this patent is extended or adjusted under 35 U.S.C. 154(b) by 0 days.

(21) Appl. No.: 12/384,158

(22) Filed: Apr. 2, 2009

(65) Prior Publication Data
US 2009/0255346 A1 Oct. 15, 2009

Related U.S. Application Data

(60) Provisional application No. 61/123,828, filed on Apr. 11, 2008.

(51) Int. Cl.
*G01F 15/00* (2006.01)
(52) U.S. Cl. .................................. 73/861.77
(58) Field of Classification Search ............... 73/861.77, 73/861.79, 861.03, 861.78; 702/45
See application file for complete search history.

(56) References Cited

U.S. PATENT DOCUMENTS

| | | | | |
|---|---|---|---|---|
| 4,258,568 A * | 3/1981 | Boetes et al. | ............... | 73/170.11 |
| 6,517,707 B2 * | 2/2003 | Giordano et al. | ............... | 210/87 |
| 6,611,769 B2 * | 8/2003 | Olson | ............................. | 702/45 |
| 7,135,986 B2 * | 11/2006 | Winter | ...................... | 340/870.02 |
| 7,245,230 B2 | 7/2007 | Salser et al. | | |
| 7,267,014 B2 * | 9/2007 | Winter | ...................... | 73/861.79 |

* cited by examiner

*Primary Examiner* — Jewel V Thompson
(74) *Attorney, Agent, or Firm* — Morland C. Fischer

(57) ABSTRACT

An encoder-type register for an automatic meter reader to be interfaced with a visual read-only register of the kind found in a water meter that measures water consumption. The water meter register has a rotatable sweep hand that carries a magnet and rotates around a register plate in relation to the speed and volume of water moving through the water meter. A plurality of (e.g., three) magnetic (e.g., Hall effect) sensors are fixedly positioned one-after-another in the path of the magnet carried by the rotating sweep hand. The magnetic sensors measure the magnetic field produced by the rotating magnet and generate corresponding output signals. A microprocessor receives the output signals generated by the magnetic sensors whenever the magnet rotates therepast. The microprocessor stores information concerning the number of rotations of the magnet carried by the sweep hand depending upon the direction in which the magnet is being rotated as an indication of water consumption. The microprocessor provides the stored information to a meter interface unit connected to a set of output terminals of the encoder register so that such information can be transmitted from the meter interface unit to a remote data collector over a wireless communication path.

21 Claims, 7 Drawing Sheets

ENCODER-TYPE REGISTER FOR AN AUTOMATIC WATER METER READER

CROSS-REFERENCE TO RELATED PATENT APPLICATION

This application is related to Provisional Patent Application No. 61/123,828 filed Apr. 11, 2008.

BACKGROUND OF THE INVENTION

1. Field of the Invention

This invention relates to an encoder-type register to be interfaced with a standard visual read-only register of the kind commonly found in a water meter that measures water consumption. By virtue of the encoder-type register of this invention, an indication of water consumption can be automatically recorded and transmitted to a remote data collector for processing (e.g., billing, analysis or record-keeping purposes).

2. Background Art

Residential and commercial structures which receive water from a utility or municipality usually have a water meter connected to the water line to monitor water consumption. Conventional water meters have a visual read-only register which includes a rotating sweep hand that moves in relation to the velocity and amount of water being consumed. A rotating mechanical wheel-type counter is incremented as the sweep hand rotates. The counter provides a numerical indication of water consumed by a user.

In this regard, it is necessary that the counter of the read-only register be read on a regular basis so that the water supplier can bill the user for its consumption. To accomplish the foregoing, a meter reader typically travels from one water meter to the next throughout the day to make a visual inspection of the associated counters and manually record the numerical values indicated thereby. The values collected by the meter reader are carried back to the water supplier for processing. However, such a technique of employing meter readers to personally visit and visually inspect the read-only register of every water meter along his route is time consuming, inefficient, relatively expensive, and may result in inaccurate readings being taken by a tired or inattentive workman.

Therefore, what is desirable is a means by which to automatically obtain an indication of the volume of water flowing through a water meter so that corresponding information can be collected and transmitted to the water supplier without the requirement that a water meter reader personally gain access to and visually inspect the water meters of users.

SUMMARY OF THE INVENTION

In general terms, an encoder-type register for an automatic meter reader is disclosed to be interfaced with a standard visual read-only register commonly found in a conventional water meter that measures water consumption of a user. The visual read-only register includes a numerically inscribed register plate and a rotatable sweep hand which moves around the register plate in relation to the speed and volume of water moving through the water meter. A mechanical wheel-type counter that is visible through the register plate is incremented each time the sweep hand completes a rotation around the register plate so that a numerical value indicative of the user's water consumption can be read from the counter and manually recorded for processing.

The encoder-type register of the automatic meter reader is located in a protective encoder housing that sits atop the water meter. The encoder-type register is adapted to automatically monitor and record the user's water consumption and transmit an indication thereof to a remote data collector without the need for a meter reader to personally visit and visually inspect the read-only register. According to a preferred embodiment, a magnet is affixed to one end of the sweep hand so as to be rotatable therewith around the register plate of the read-only register. A plurality of (e.g., three) magnetic sensors (preferably Hall Effect devices) are positioned in the path of the rotating sweep hand and the magnet carried thereby. A battery-powered microprocessor that is mounted on a circuit board within the encoder housing takes measurements of the magnetic sensors. Signals generated by successive ones of the sequence of magnetic sensors are amplified, digitized and measured by the microprocessor to provide an indication when the sweep hand has completed one revolution around the register plate and that water is flowing in a forward direction through the water meter. Should the microprocessor detect signals generated by the magnetic sensors in an opposite sequence, an indication is provided of water backflow through the water meter and the sweep hand rotating in an opposite direction around the register plate.

The microprocessor has an internal register in which to store a record corresponding to the rotations completed by the sweep hand around the register plate and the magnet moving past the sequence of magnetic sensors. The record (i.e., count) is incremented after each revolution of the sweep hand. The number stored in the register will be decremented in the event that the microprocessor detects water backflow and signals generated by the magnetic sensors in an opposite sequence. Output data is provided by the microprocessor to a set of output terminals by way of conductive pins which run upwardly from the circuit board, through the encoder housing, to an output terminal housing at which a set of wires are connected to respective ones of the output terminals. The wires extend outwardly from the output terminal housing for connection to a commercially-available meter interface unit stationed adjacent the water meter. The meter interface unit is adapted to receive the output data from the microprocessor and transmit the data (e.g., by wireless means) to a remote data collector for processing. The microprocessor is programmed to complete its measurement of the magnetic sensors and transmit the output data at predetermined times as determined by an internal clock or periodically in response to a demand signal initiated by the meter interface unit.

DESCRIPTION OF THE PREFERRED EMBODIMENT

Figure 1:
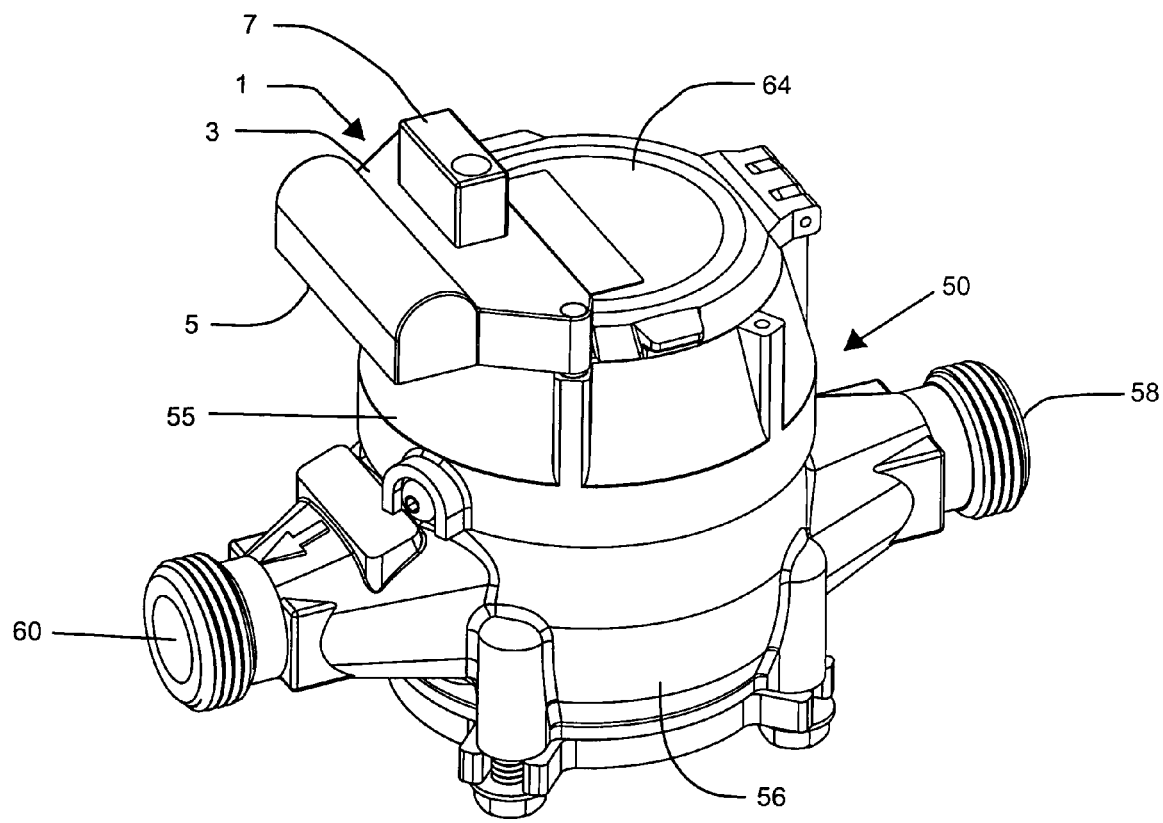
FIG. 1 is a perspective view of a water meter including an encoder housing for enclosing an encoder-type register of an automatic meter reader which forms the present invention to be interfaced with a standard read-only register accessible below a register cover of the water meter.
Figure 2:
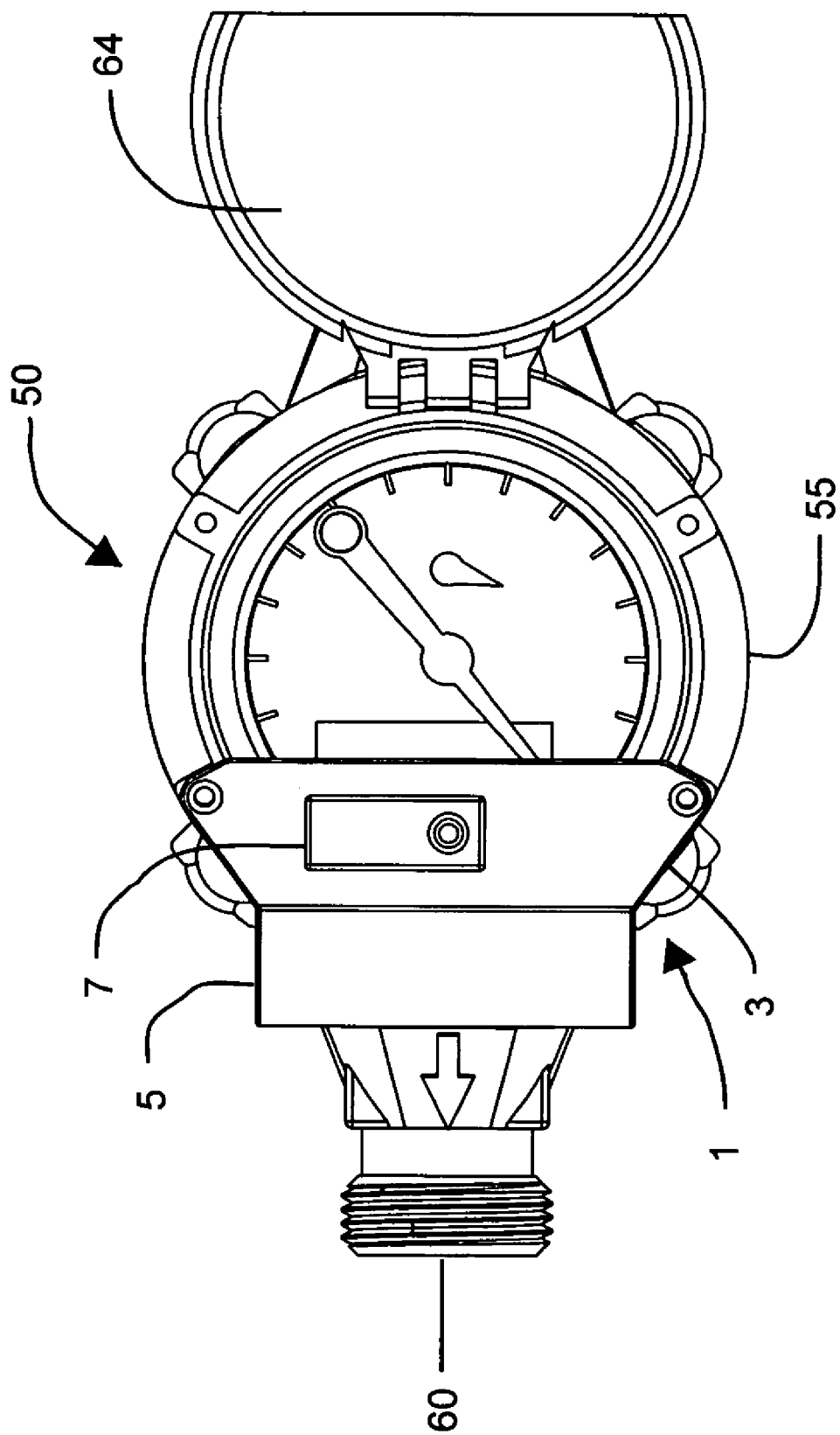
FIG. 2 is a top view of the water meter of FIG. 1 with a register cover thereof rotated to an open position to permit visual access to the read-only register.

An encoder-type register 1 of an automatic meter reader to be interfaced with a standard visual read-only register is disclosed below. By way of example only, the encoder-type register 1 is ideally suited for use in reading a conventional water meter of the kind used to measure the volume, in cubic feet, of water consumed by a residential or commercial user. A suitable water meter 50 with which the encoder-type register 1 of this invention can be incorporated is illustrated in FIGS. 1 and 2 of the drawings. In this case, the water meter 1 includes a visual read-only register having a numerically-inscribed register plate 52 and a rotatable sweep hand 54 which moves over and around the register plate 52 at a speed that is proportional to the velocity and amount of water moving through the body 56 of water meter 50 between inlet and outlet ports 58 and 60. A mechanical rotating wheel-type counter 62 that is visible through an opening in the register plate 52 is incremented as the sweep hand 54 completes rotations around the register plate. Counter 62 can be read by a meter reader so that a numerical value indicative of the user's water consumption can be recorded for processing by the water supplier.

A register cover 64 is pivotally coupled to a shroud 55 that sits upon the body 56 of the water meter 50. The register cover 64 is rotatable from a closed position as shown in FIG. 1, at which to cover the register plate 52 and the visual read-only counter 62, to an open position as shown in FIG. 2, at which the register plate 52, sweep hand 54 and counter 62 are visually accessible to the meter reader for inspection.

The encoder-type register 1 of this invention supplements the usual visual read-only register commonly used with water meters and provides an efficient way to automatically read and record the user's water consumption without the requirement that a meter reader personally visit and inspect each water meter of each user. The encoder-type register 1 is surrounded and protected by an encoder housing 3. A battery housing 5 in which a battery is carried is located at one side of the encoder housing. The encoder housing 3 is preferably connected to the top of the shroud 55 of water meter 50 adjacent the register cover 64. An encoder output terminal housing 7 is mounted atop the encoder housing 3. As will be described when referring to FIGS. 4 and 5, a set of (e.g., three) shielded output wires are surrounded by and extend outwardly from the output terminal housing 7 to be connected to a meter interface unit, the function of which will be disclosed in greater detail hereinafter.

Figure 3:
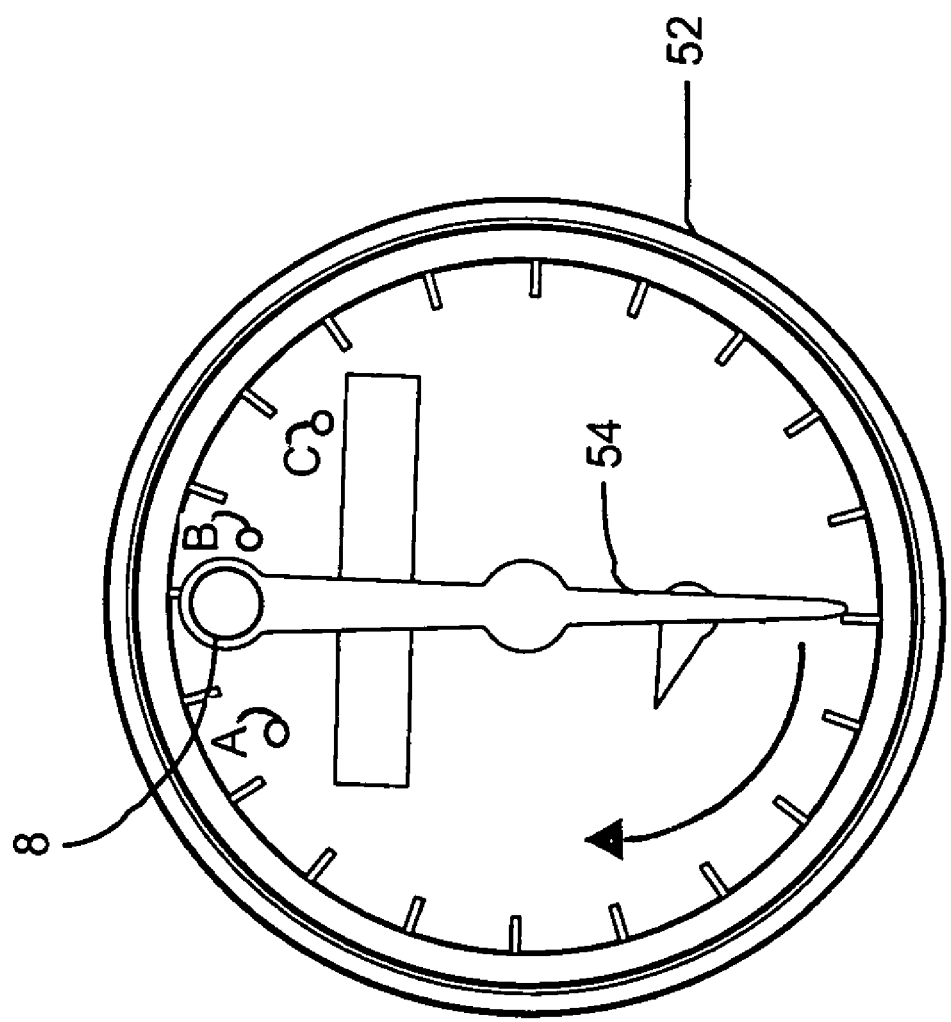
FIG. 3 is illustrative of the path of a magnet carried by the sweep hand of the read-only register past a series of magnetic sensors.
Figure 5:
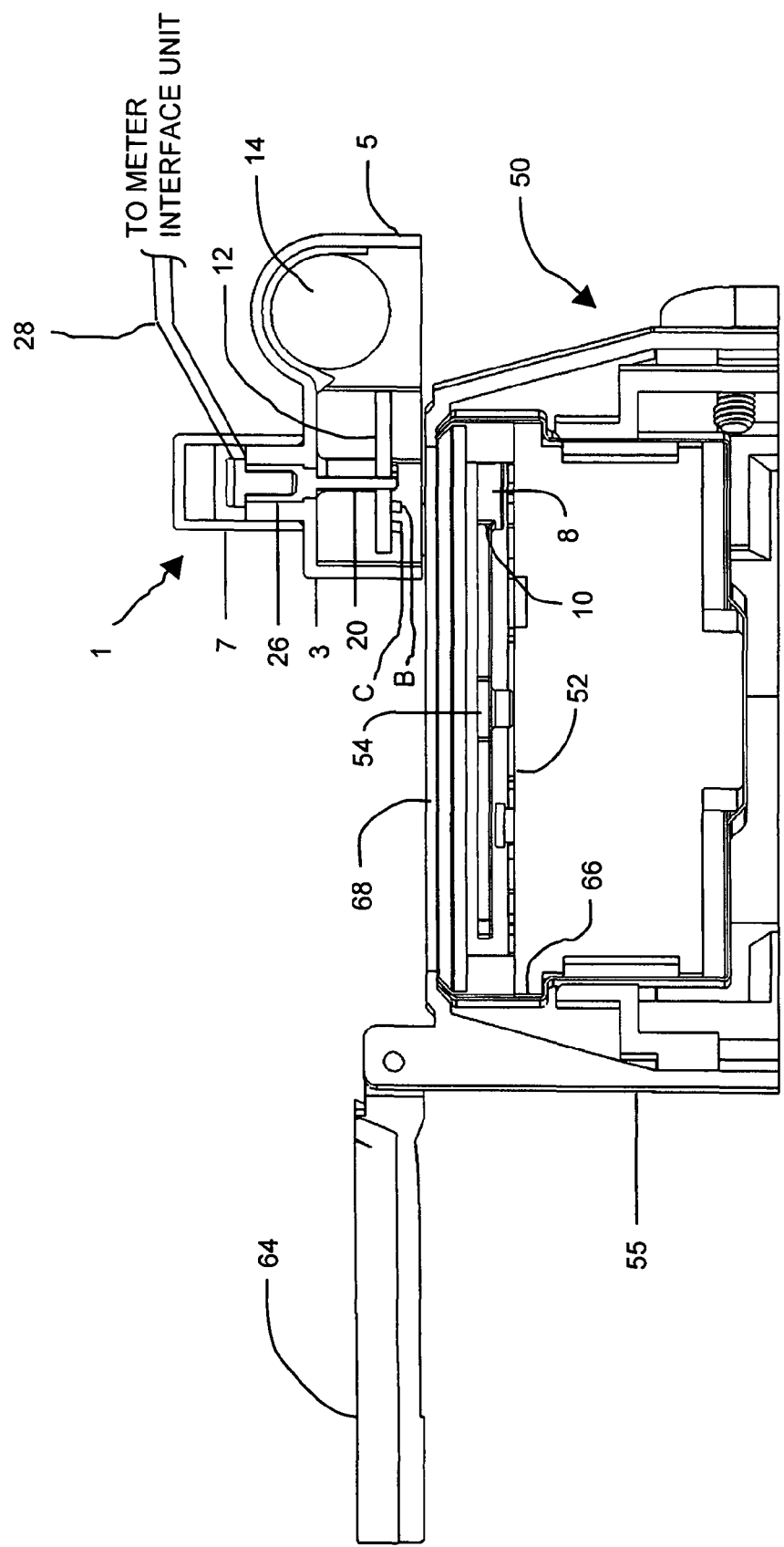
FIG. 5 is a cross section of the water meter showing the battery housing, the encoder housing, and the encoder-type register in relation to the read-only register.

FIG. 3 of the drawings represents the register plate 52 of the read-only register water meter 50 of FIGS. 1 and 2. The sweep hand 54 is coupled to a waterflow-responsive turbine assembly (not shown) positioned between the inlet and outlet ports 58 and 60 of water meter 50 so that the sweep hand is rotated by the turbine assembly around the register plate 52. As an important feature of this invention, a series of (e.g., three) magnetic sensors, designated A, B and C, are spaced from one another in the path of the sweep hand 54. As is best shown in FIG. 5, the magnetic sensors A, B, and C are located above the register plate 52. A (e.g., disc-shaped) magnet 8 is attached to and carried at one end of the sweep hand 54. As the sweep hand 54 rotates around the register plate 52, the magnet 8 is correspondingly moved past successive ones of the magnetic sensors A, B and C in response to water flowing through the water meter 50 from the inlet port 58 thereof to the outlet port 60.

Figure 4:
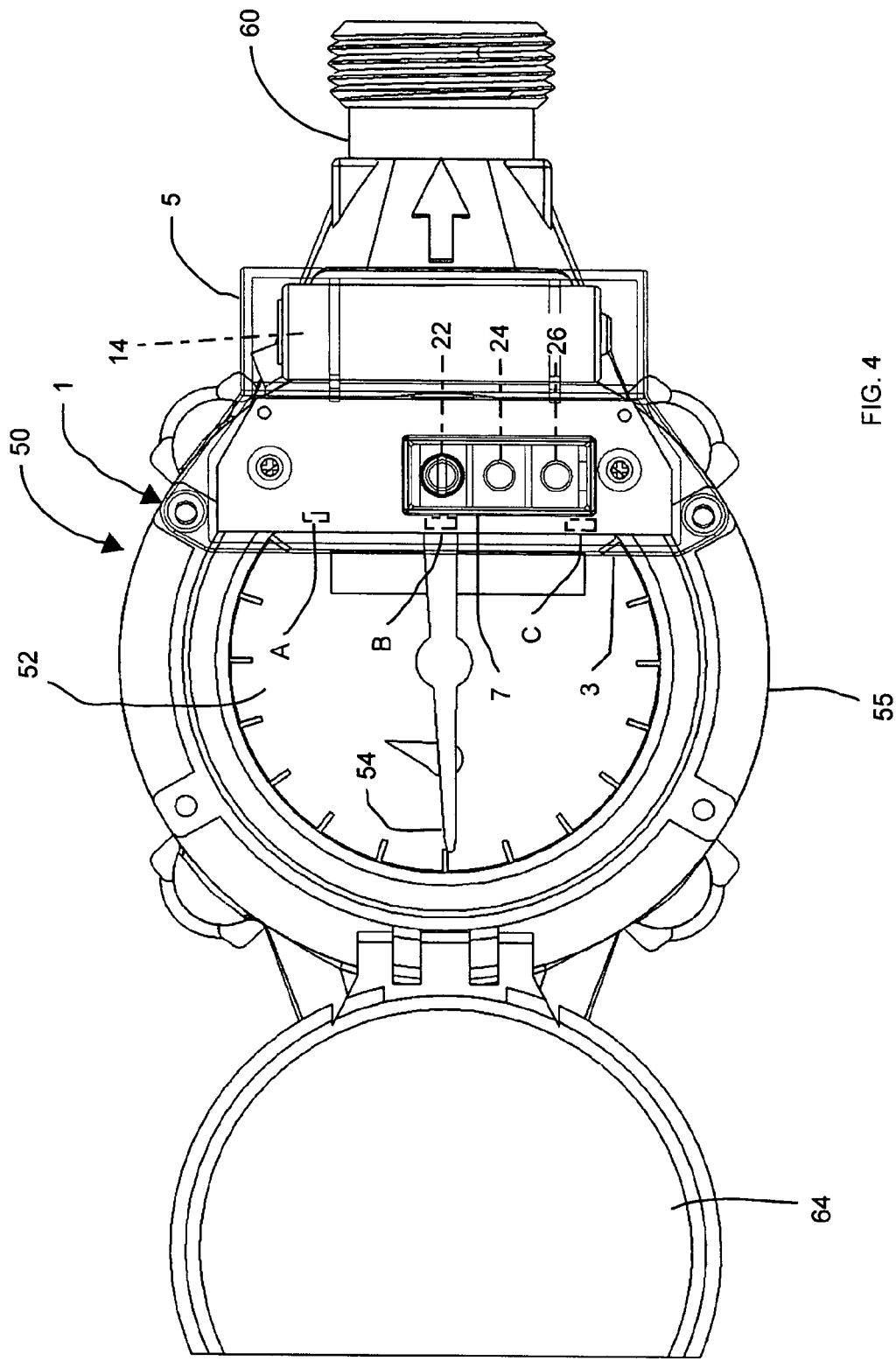
FIG. 4 is a top view of the water meter showing a battery housing, the encoder housing, and the encoder-type register in relation to the read-only register.

Details of the encoder-type register 1 of this invention including the series of magnets A, B and C past which the magnet 8 carried by the sweep hand 54 is moved are now described while referring to FIGS. 4 and 5 of the drawings. Positioned within the shroud 55 above the body 56 of water meter 50 is a hollow copper can 66 which is common to many modern water meters. The register cover 64 which is pivotally coupled to the shroud 55 is shown in FIG. 5 in the aforementioned open position rotated away from the glass layer 68 at the top of the can 66 to permit visual access to the register plate 52 and the rotatable sweep hand 54.

The register plate 52 and sweep hand 54 are disposed inside the hollow can 56. The magnet 8 carried by the sweep hand 54 is mounted within a pocket 10 at one end of the sweep hand. Located at the top of the can 66 above the register plate 52 and the rotatable sweep hand 54 is a piece of transparent protective (e.g., glass) material 68. When the register cover 64 is rotated relative to the shroud 55 to the open position (of FIG. 2) the protective material 68 prevents a manual or environmental interference with the rotation of the sweep hand 54 and the magnet 8 that is carried thereby around the register plate 52.

As previously explained while referring to FIG. 3, the magnet 8 that is carried by the sweep hand 54 is moved sequentially past a series of magnetic sensors A, B and C. The magnetic sensors A, B and C are mounted below a circuit board 12 of the encoder-type register 1. The circuit board 12 and the magnetic sensors A, B and C are located in and surrounded by the encoder housing 3. The encoder housing 3 is preferably filled with a non-conductive potting material in which the circuit board 12 and magnetic sensors are embedded. Also mounted on the circuit board 12 is a microprocessor (designated 38 in FIG. 6), the function of which will be described while referring to FIG. 6. The microprocessor is powered by a (e.g., 3.6 volt lithium) battery 14 that is located in the battery housing 5 alongside the encoder housing 3.

A plurality of (e.g., three) electrically-conductive (e.g., brass) connector pins 16, 18 and 20 (best shown in FIG. 4) extend upwardly from the circuit board 12, through the encoder housing 3, and into the encoder output terminal housing 7 to terminate at a corresponding plurality of (e.g., screw head) register output terminals 22, 24 and 26. As will also be described when referring to FIG. 6, a plurality of (e.g., three) wires (only one of which 28 being shown in FIG. 5) are connected to respective ones of the register output terminals 22, 24 and 26 within the encoder output terminal housing 7. By virtue of the foregoing, output signals generated by the microprocessor are provided from the circuit board 12 via connector pins 16, 18 and 20 to be carried by the wires connected to respective output terminals 22, 24 and 26 to indicate when the magnet 8 rotates with sweep hand 54 past the sensors A, B and C during one revolution of the sweep hand 54 around the register plate 52.

To this end, the wires (e.g., 28) connected to respective output terminals 22, 24 and 26 at the encoder output terminal housing 7 may be connected to a conventional meter interface unit stationed nearby the water meter. By way of example, a suitable meter interface unit to be interfaced with the encoder-type register 1 of this invention is that known commercially as the Itron Badger. However, the particular meter interface unit is a matter of choice and forms no part of this invention.

The meter interface unit (designated 44 in FIG. 6) is adapted to communicate with a compatible remote data collector. That is, information regarding the number of revolutions completed by the sweep hand 54 and the magnet 8 carried therewith past magnetic sensors A, B and C is stored by the meter interface unit for (e.g., wireless) transmission to the data collector. The remote data collector may be carried by hand, attached to a moving vehicle, or static and mounted at a fixed location, such as a telephone pole, or the like. The information transmitted to the data collector from the meter interface unit can be ultimately made available to utilities, municipalities, or private concerns to indicate water consumption at the monitored water meter for billing, analysis or record-keeping purposes.

Figure 6:
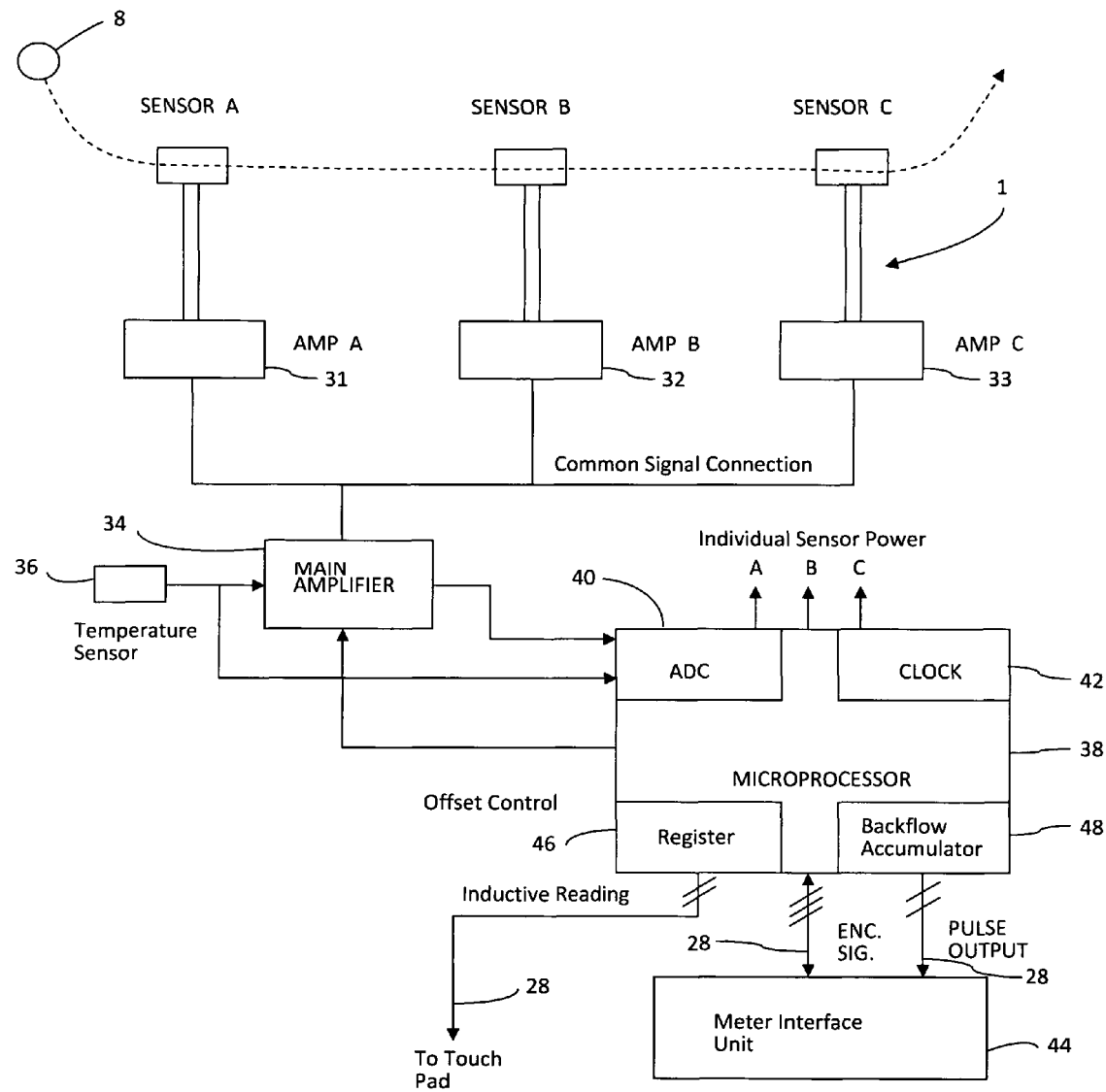
FIG. 6 is a block diagram to illustrate a preferred implementation of the encoder-type register.

Turning now to FIG. 6 of the drawings, there is shown a block diagram that is representative of the encoder-type register 1 of FIGS. 1-5 for automatically collecting information concerning water consumption depending upon the number of revolutions completed by the magnet 8 with sweep hand 54 past the sequence of magnetic sensors A, B and C. The magnetic sensors A, B and C are preferably Hall Effect sensors that are spaced equal distances from one another along the bottom of the circuit board (designated 12 in FIGS. 4 and 5). Each sensor is connected to a first stage transistor amplifier 31, 32 and 33. The amplifiers 31-33 increase the signal amplitude of the magnetic sensors and convert the usual differential DC voltage signal provided by a Hall Effect device that is indicative of a magnetic field to a single (i.e., linear) signal. To minimize power consumption, the Hall Effect magnetic sensors A, B and C and their respective amplifiers 31-33 are powered only when the microprocessor 38 requires measurements of the magnetic signals. In this regard, only one magnetic sensor (e.g., A) and the amplifier (e.g., 31) associated therewith are powered at any one time.

The outputs of amplifiers 31-33 are connected through a common input terminal to a second stage or main amplifier 34 (e.g., a MCP6001T microchip). The main amplifier 34 provides additional amplification of the DC voltage signals provided by Hall Effect sensors A, B and C. A temperature sensor 36 is connected to the main amplifier 34 to compensate for any temperature drift associated with the amplifiers 31-33. The main amplifier 34 is also powered when magnetic measurements are required by the microprocessor 38. A resistive temperature sensor (e.g., a thermistor) 36 is desirable to monitor the ambient temperature of the encoder-type register 1. Amplifiers 31-33 typically do not contain temperature compensation and therefore, are known to exhibit a DC shift with temperature. The main (second stage) amplifier 34 amplifies the voltage signals that are sequentially provided thereto by the (first stage) amplifiers 31-33 and sums each signal with the output of the temperature sensor 36.

The temperature compensated output of the main amplifier 34 is supplied to an analog-to-digital converter (ADC) 40. The ADC 40 is preferably integrated within the microprocessor 38. ADC 40 is responsive to both the DC voltage supplied by the main amplifier 34 and the DC voltage generated by the temperature sensor 36.

Power, control and measurement activities are performed by the microprocessor 38. By way of example only, a suitable microprocessor for use herein is part number PIC16F684. The microprocessor 38 is responsible for controlling the analog circuits, taking measurements of the magnetic sensors A, B and C, determining whether the rotation of the magnet 8 is in a forward direction past the sequence of sensors A, B and C or in a reverse direction past the sequence of sensors C, B and A, measuring ambient temperature, processing requests for information from the meter interface unit, and managing power consumption to maximize the life of the battery (14 in FIGS. 4 and 5). The microprocessor 38 spends the majority of its time in a low-power sleep mode. Microprocessor 38 can be awakened to perform its activities on a predetermined regular time basis by means of an onboard clock 42 or periodically by means of an encoded signal request initiated by the meter interface unit 44.

Once it is awakened, the microprocessor 38 determines whether its wake up was caused by a regular timed signal produced by the onboard clock 42 or a periodic encoded signal produced by the meter interface unit 44. In the event of a timer-induced wake up initiated by clock 42, the microprocessor 38 performs a magnetic sensing task during which measurements are taken of all three magnetic sensors A, B and C. To maximize battery life, measurement of a single magnetic sensor is completed in about 25 to 50 microseconds during which the sensors A, B and C and the first and second stage amplifiers 31-34 are powered up, the sensor outputs amplified by the first and second stage amplifiers 31-34 are digitized, and the sensors A, B and C are then powered down. Each sensor value is compared with a predetermined calibration value that is initially stored in the microprocessor 38. Where the output of a magnetic sensor is greater than a predetermined deviation from the predetermined calibration value, an indication is provided to the microprocessor 38 that the magnet 8 is passing (with the sweep hand) in the vicinity of the measured sensor.

The measured sensor value can be adjusted by a standard software routine to compensate for temperature drift. Because ambient temperature will not change rapidly, the temperature sensor 36 need only be measured by the microprocessor 38 on a periodic basis (e.g., once every 15 to 60 minutes).

An internal register 46 of the microprocessor 38 records the number of complete rotations made by the magnet 8 past the sequence of sensors A, B and C. Each time the magnet 8 moves in a forward direction past sensors A, B and C during a full rotation of the sweep hand, the rotation total that is stored in the register 46 of microprocessor 38 is incremented. However, should the magnet 8 move in a reverse direction past sensors C, B and A (indicative of water backflow through the water meter), then the rotation total stored in register 46 is decremented.

Rather than counting and reading the accumulated number of rotations of the magnet, the microprocessor 38 may also generate an output pulse to the meter interface unit 44 each time the magnet 8 completes a rotation in a forward direction past the sequence of sensors A, B and C. In the output pulse mode, the microprocessor 38 includes a backflow accumulator 48 which suppresses the generation of output pulses following a water backflow event (i.e., when the magnet 8 travels in a reverse direction past magnetic sensors C, B and A). The backflow accumulator 48 counts the number of consecutive revolutions of the magnet 8 in the reverse direction. Output pulses indicative of a subsequent forward flow event will be suppressed until the count of the backflow accumulator 48 has been decremented to zero.

In the event that the wake up of microprocessor 38 is not initiated by the onboard clock 42, a determination is first made as to the type of wake up request. Encoder-type register 1 of FIG. 6 supports three different modes of wake up requests. One request is an encoded signal mode initiated by the meter interface device 44. A second request is an inductive tone reading mode. The third request is the aforementioned pulse output mode to device 44.

In the output pulse mode described above, two of the three wires 28 connected to the output terminals 26 (of FIG. 5) of the encoder-type register 1 are used to transmit an electronic pulse output from the microprocessor 38 to the meter interface unit 44 following each forward flow event. The third wire provides a grounded tamper detect to unit 44. In the inductive tone reading mode, an attached inductive touch pad is interrogated by a hand-held reader to obtain a reading of the count stored in register 46 of microprocessor 38. The reader applies a high frequency signal to the touch pad, and the microprocessor 38 responds by providing a high frequency return signal. An industry standard Sensus Compatible communication technique is employed. In the encoded signal mode, one of the output wires 28 is a common wire, one is a clock input, and the third is a data output. Once again, a standard Sensus Compatible mode of communication is employed between the register 1 and meter interface device 44.

The microprocessor 38 keeps track of the number of complete rotations of the magnet 8 in the forward direction past magnetic sensors A, B and C. The count stored in internal register 46 is reflective of the volume of water flowing between the inlet and outlet ports 58 and 60 of the water meter 50 of FIGS. 1 and 2 to be consumed by a user. The microprocessor 38 provides an output signal to the meter interface unit 44 (during the encoded signal mode) or to the inductive touch pad (during the inductive tone reading mode) which is indicative of the total number of revolutions completed by the magnet 8. In the alternative, the microprocessor 38 may also provide output pulses to the meter interface device 44 during the pulse output mode following each complete rotation of the magnet 8 in the forward direction. In this case, the meter interface unit 44 stores the total number of pulses as an indication of water consumption. The information stored by the meter interface unit 44 can then be transmitted to a remote data collector as earlier described.

Figure 7:
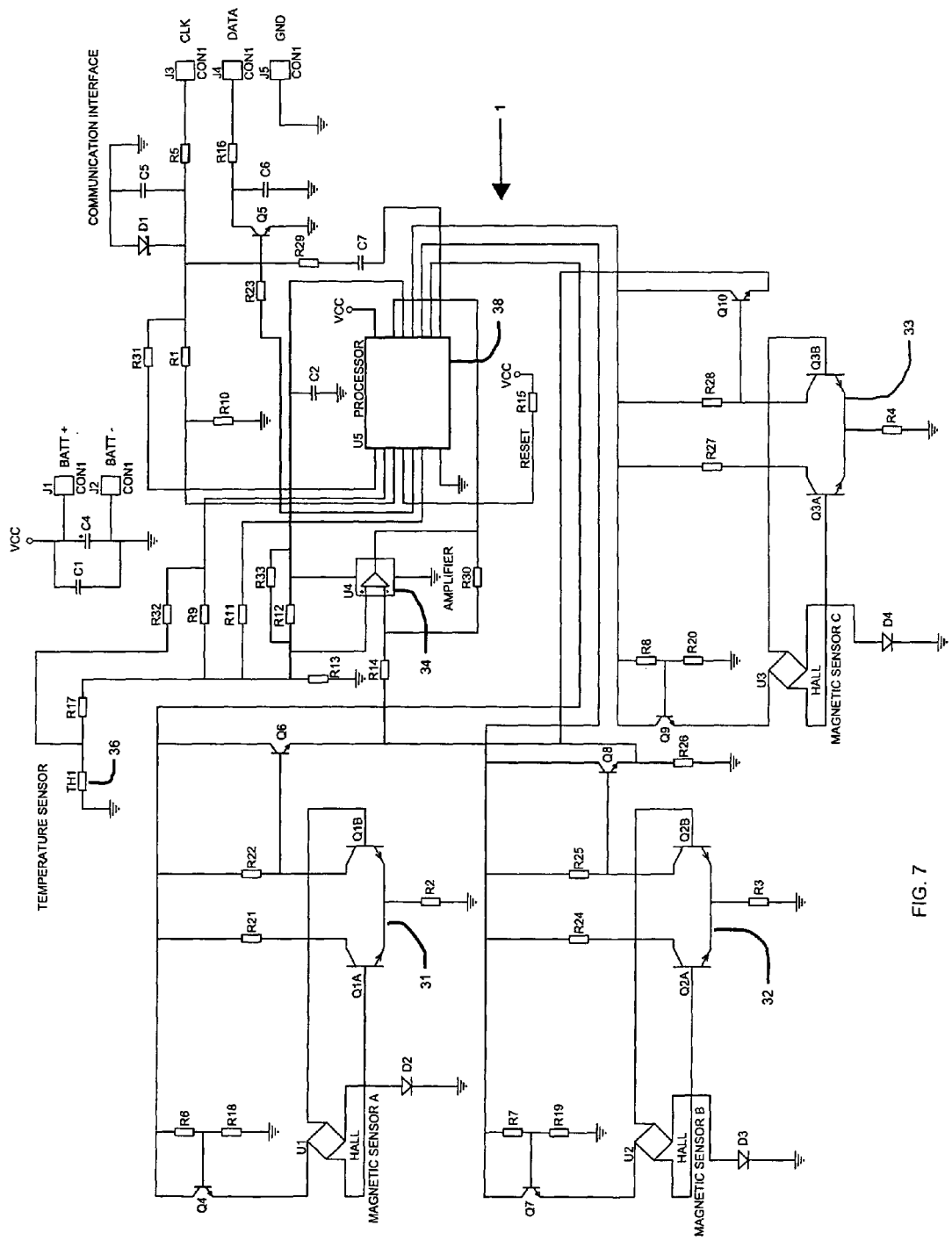
FIG. 7 is an example of a preferred schematic circuit by which to implement the encoder-type register of this invention.

FIG. 7 of the drawings shows a preferred schematic circuit for implementing the encoder-type register 1 of FIGS. 1-6. Although the encoder-type register 1 has been shown and described herein as having particular application for use in a water meter to automatically record and transmit information regarding water consumption, the register 1 of this invention is suitable for use as an add-on accumulator to be interfaced with other visual read-only registers. For example, rather than being carried by a sweep hand, the magnet 8 can be attached to and rotatable with a rotating disc-like register plate that is common to meters which measure the consumption of electricity.

The invention claimed is:

1. A combination comprising:
    a meter having a casing and a rotatable sweep hand which is located within said casing and which rotates in response to a material moving relative to the meter; and
    a register having a housing and at least one sensor located within said housing and fixedly positioned in the path of said rotatable sweep hand and adapted to generate an output signal each time said sweep hand rotates past said sensor, said register also having means located in said register housing to receive the output signal generated by said sensor for providing an indication of the material moving relative to said meter depending upon the number of rotations of said sweep hand past said sensor and the corresponding signals generated by said sensor,
    said meter casing and said register housing being separated from one another by an optically transparent and magnetically permeable cover that is located between said at least one sensor and said sweep hand.

2. The combination recited in claim 1, wherein the meter is a water meter and the material moving relative to said meter is water which moves through said meter to cause said sweep hand to rotate.

3. The combination recited in claim 1, wherein said meter also has a magnet carried by said sweep hand and located within said meter casing, and wherein the at least one sensor of said register is a magnetic sensor located in said register housing and responsive to the magnetic field generated by said magnet rotating with said sweep hand.

4. The combination recited in claim 3, wherein said magnetic sensor is a Hall effect sensor.

5. The combination recited in claim 3, wherein the at least one sensor of said register is a plurality of magnetic sensors fixedly positioned one-after-another in the path of said rotating sweep hand, each of said plurality of magnetic sensors adapted to generate an output signal when the magnet carried by said sweep hand rotates therepast.

6. The combination recited in claim 5, wherein the means of said register to receive the output signals generated by said plurality of magnetic sensors is a microprocessor located within said register housing, the order in which said output signals are generated by successive ones of said magnetic sensors and received by said microprocessor being indicative of the direction in which the magnet that is carried by said rotatable sweep hand rotates with said sweep hand past said sensors and the direction in which the material is moving relative to said meter.

7. The combination recited in claim 6, said register also having a plurality of amplifiers connected between respective ones of said plurality of magnetic sensors to receive and amplify the output signals generated thereby and said microprocessor, and a temperature sensor connected to said microprocessor, said microprocessor compensating for drift caused by temperature to the output signals generated by said plurality of magnetic sensors and amplified by said plurality of amplifiers depending upon the temperature sensed by said temperature sensor.

8. The combination recited in claim 6, wherein the microprocessor of said register is responsive to the number of output signals generated and the order in which said output signals are generated by said plurality of magnetic sensors to provide an indication of the amount of material moving relative to the meter.

9. The combination recited in claim 6, wherein the microprocessor of said register includes a counter in which to store a count that is indicative of the number of output signals generated by said plurality of magnetic sensors, the count stored by said counter being incremented each time the magnet carried by and rotatable with said sweep hand rotates in a first direction past said plurality of said magnetic sensors and decremented each time the magnet carried by and rotatable with said sweep hand rotates in an opposite direction past said plurality of said magnetic sensors.

10. The combination recited in claim 9, further comprising a register output terminal and a circuit board on which said microprocessor is mounted, said circuit board located with said microprocessor within said register housing and electrically connected to said register output terminal so that information indicative of the count stored by the counter of said microprocessor is provided to said register output terminal by way of said circuit board.

11. The combination recited in claim 10, wherein said register output terminal is spaced from said circuit board, said combination further comprising at least one electrically-conductive pin connected between said circuit board within said register housing and said register output terminal so that the count stored by the counter of said microprocessor is provided to said register output terminal by way of said circuit board and said electrically-conductive pin.

12. The combination recited in claim 10, further comprising a register output terminal housing, said register output terminal being enclosed by said register output terminal housing.

13. The combination recited in claim 12, further comprising a transmitter located outside said register output terminal housing and interconnected with said register output terminal located within said register output terminal housing by means of an electrical connector connected between said transmitter and said register output terminal through said register output terminal housing, said transmitter receiving the information provided to said register output terminal from said microprocessor regarding the count of said microprocessor, and said transmitter adapted to transmit said information to a remote location over a wireless communication path.

14. A combination comprising:
a meter to take a measurement and having a rotatable sweep hand which rotates in response to the measurement taken by said meter;
a magnet to generate a magnetic field, said magnet located on and rotatable with said sweep hand; and
a register having a plurality of magnetic sensors fixedly positioned one-after-another in the path of said rotatable sweep hand and adapted to measure the magnetic field generated by the magnet located on said sweep hand, said plurality of magnetic sensors providing output signals in response to a rotation of said sweep hand and said magnet therepast whenever the magnitude of the magnetic field generated by said magnet and measured by said plurality of magnetic sensors is greater than a predetermined magnitude.

15. The combination recited in claim 14, wherein said register also has a microprocessor to count the number of signals generated by said plurality of magnetic sensors and the order in which said signals are generated depending upon the direction in which said sweep hand and the magnet located thereon rotate past said magnetic sensors, said microprocessor increasing the count of the number of signals generated by said plurality of magnetic sensors whenever said sweep hand rotates in a first direction past said magnetic sensors and decreasing said count whenever said sweep hand rotates in an opposite direction past said magnetic sensors.

16. The combination recited in claim 15, wherein said microprocessor compares the magnitude of the magnetic field measured by said plurality of magnetic sensors and compares said measured magnetic field with said predetermined magnitude, the count provided by said microprocessor being increased or decreased only if the magnitude of the magnetic field measured by said plurality of magnetic sensors when said sweep hand and said magnet carried thereby rotate therepast is greater than the predetermined magnitude.

17. The combination recited in claim 5, wherein said plurality of magnetic sensors are surrounded by and embedded within a potting material within said register housing.

18. The combination recited in claim 6, further comprising a battery to provide power to said microprocessor and a battery housing in which said battery is located, said battery housing being separated from each one of said meter casing in which said sweep hand is located and said register housing in which said at least one sensor is located.

19. The combination recited in claim 12, wherein said register output terminal housing within which said register output terminal is located is separated from each of said meter casing within which said sweep hand is located and said register housing within which said microprocessor and said microprocessor circuit board are located, said combination further comprising an electrical connector extending between said register output terminal housing and said register housing by which said register output terminal is electrically connected to said microprocessor circuit board and to said microprocessor mounted thereon.

20. The combination recited in claim 15, further comprising a meter interface unit electrically connected to said microprocessor to receive information from said microprocessor regarding the number of signals counted by said microprocessor, said meter interface unit adapted to store and transmit said information to a remote location over a wireless communication path, and said meter interface unit being responsive to an interrogation signal generated by an external data reader to enable the data reader to obtain the information from said microprocessor corresponding to the signals counted thereby.

21. The combination recited in claim 16, wherein said meter has a casing within which is located said sweep hand and said magnet located on said sweep hand, and said register has a housing within which said plurality of magnetic sensors are located, said meter casing and said register housing being separated from one another by an optically transparent and magnetically permeable cover, said cover located between said sweep hand and said plurality of magnetic sensors.

\* \* \* \* \*